(12) United States Patent
Nakata (10) Patent No.: US 8,339,809 B2
(45) Date of Patent: Dec. 25, 2012

(54) SWITCHING POWER SUPPLY DEVICE

(75) Inventor: Yasuhiro Nakata, Mishima (JP)

(73) Assignee: Canon Kabushiki Kaisha, Tokyo (JP)

( * ) Notice: Subject to any disclaimer, the term of this patent is extended or adjusted under 35 U.S.C. 154(b) by 304 days.

(21) Appl. No.: 12/721,963

(22) Filed: Mar. 11, 2010

(65) Prior Publication Data

US 2010/0232186 A1   Sep. 16, 2010

(30) Foreign Application Priority Data

Mar. 13, 2009   (JP) .................... 2009-061111

(51) Int. Cl.
*H02M 3/335*   (2006.01)

(52) U.S. Cl. ............ 363/18; 363/16; 363/49; 363/21.15

(58) Field of Classification Search .................... 363/16, 363/18, 21.02, 21.03, 49, 21.15
See application file for complete search history.

(56) References Cited

U.S. PATENT DOCUMENTS

| | | | | |
|---|---|---|---|---|
| 4,937,728 A * | 6/1990 | Leonardi | ......................... | 363/97 |
| 6,160,720 A | 12/2000 | Nishida | | |
| 6,178,100 B1 * | 1/2001 | Kitano | ............................ | 363/19 |
| 6,285,566 B1 | 9/2001 | Nakahira | | |

FOREIGN PATENT DOCUMENTS

| | | |
|---|---|---|
| JP | 09-244767 A | 9/1997 |
| JP | 3386016 B2 | 10/2000 |
| JP | 2002-094748 A | 3/2002 |
| JP | 2007-236087 A | 9/2007 |

OTHER PUBLICATIONS

U.S. Appl. No. 12/727,782, filed Mar. 19, 2010, Shinichiro Matsumoto.

* cited by examiner

*Primary Examiner* — Shawn Riley
(74) *Attorney, Agent, or Firm* — Canon U.S.A., Inc. IP Division (57) ABSTRACT

A switching power supply device includes a transformer, a switching unit which is connected with a primary winding of the transformer and configured to switch a current flowing to the primary winding, a start unit configured to start the switching unit, a voltage drop unit configured to lower output voltage from a secondary winding of the transform, and a current control unit configured to control an amount of a current flowing in the start unit when the switching unit is in an off state by lowering output voltage by the voltage drop unit.

6 Claims, 8 Drawing Sheets

FIG. 8

SWITCHING POWER SUPPLY DEVICE

BACKGROUND OF THE INVENTION

1. Field of the Invention

The present invention relates to a switching power supply device, and particularly, a self-excited ringing choke converter-type switching power supply device.

2. Description of the Related Art

Figure 5:
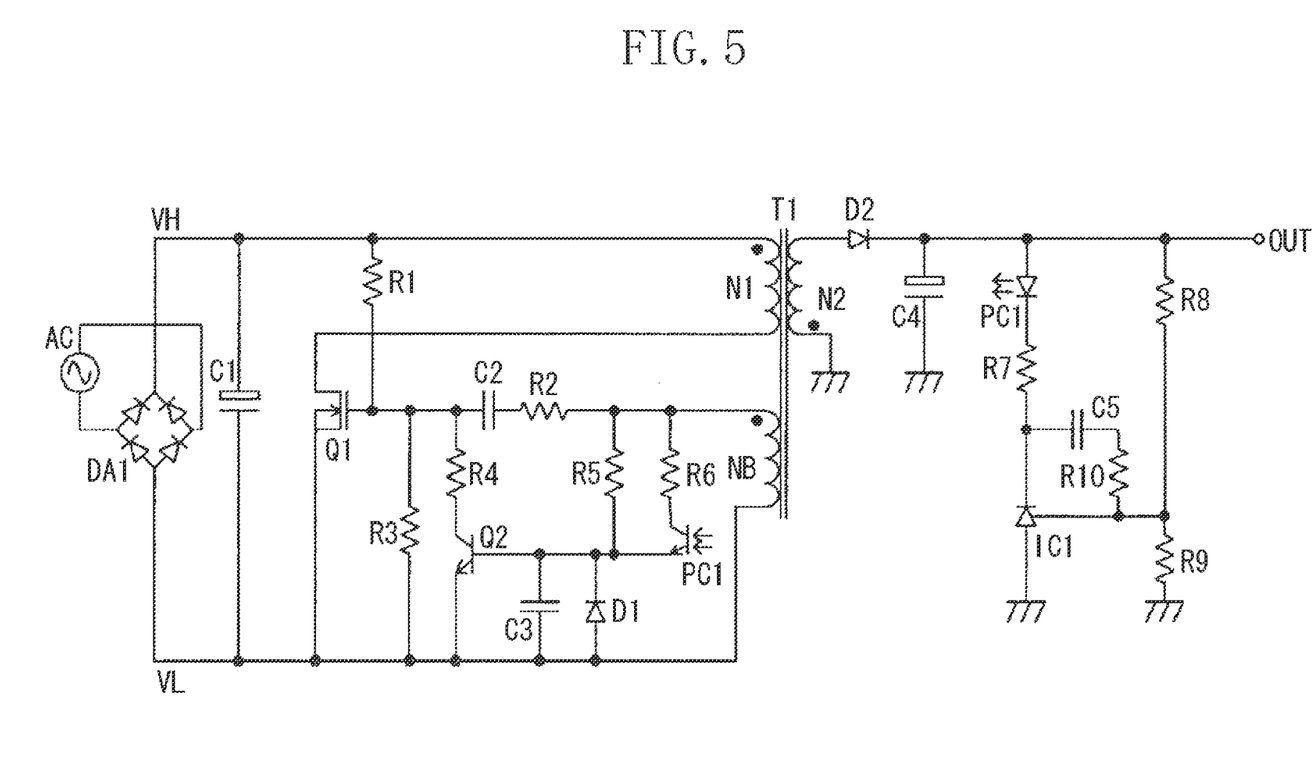
FIG. 5 illustrates a circuit of a conventional switching power supply device.
Figure 6:
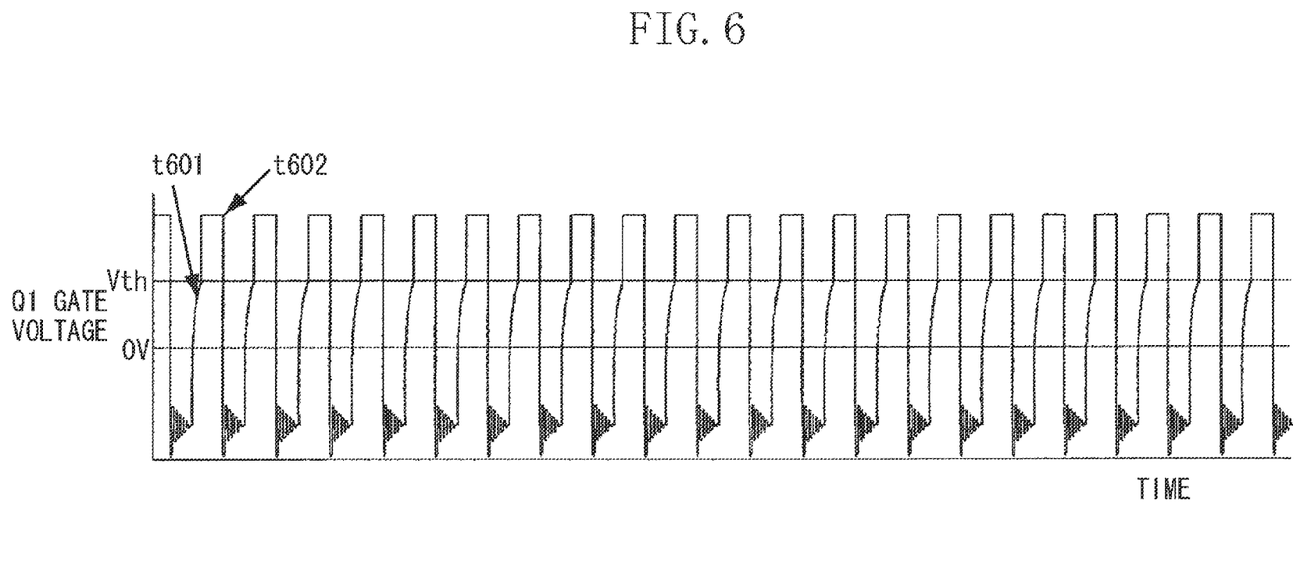
FIG. 6 illustrates gate voltage of a FET Q1 of the conventional switching power supply device in FIG. 5.

Currently, a switching power supply device is adopted as a power source for a device in many cases. Among switching power supply devices, a self-excited ringing choke converter (hereinafter referred to as RCC) has a simple configuration and is widely used as a low cost power supply device. FIG. 5 illustrates a typical configuration of an RCC. FIG. 6 illustrates a waveform of a gate voltage of a field-effect transistor (FET) Q1, and Vth is a threshold value of the gate voltage of the FET Q1.

In FIG. 5, the RCC includes a commercial power supply AC, a bridge diode DA1, and a smoothing capacitor C1. The smoothing capacitor C1 rectifies and smoothes the commercial power supply AC, and converts it to DC voltage. A high voltage side of DC voltage is denoted by VH, and a low voltage side of the DC voltage is denoted by VL. A transformer T1 includes a primary winding N1, a secondary winding N2, and a feedback winding NB. The RCC further includes a metal-oxide-semiconductor filed-effect transistor (MOSFET, hereinafter simply referred to as FET) Q1 as a main switching element, a diode D2, and a capacitor C4.

The FET Q1 is turned on and off intermittently. While the FET Q1 is turned on, current flows in the primary winding N1 of the transformer T1, and the transformer T1 stores energy. While the FET Q1 is turned off, the energy stored in the transformer T1 is released from the secondary winding N2 of the transformer T1, and the released energy is obtained by the diode D2 and the capacitor C4 as a secondary-side output DC voltage.

When the transformer T1 releases the stored energy from the secondary winding N2, the feedback winding NB generates ringing with an amplitude corresponding to a winding ratio to an output of the secondary winding N2. Voltage generated by the ringing is referred to as flyback voltage.

As illustrated with an arrow t601 in FIG. 6, the gate voltage of the FET Q1 rises by the ringing, and when the gate voltage reaches the threshold voltage Vth, the FET Q1 is turned on. When the FET Q1 is turned on, the feedback winding NB has a positive output. At this time, a capacitor C3 is charged by a current flowing in a resistance R5 and a phototransistor current in a photocoupler PC1.

As illustrated with an arrow t602 in FIG. 6, when voltage of both ends of the capacitor C3 exceeds threshold voltage of a transistor Q2, the transistor Q2 is turned on, and the FET Q1 is turned off. Therefore, the on-time period of the FET Q1 depends on charging current in the capacitor C3, that is, the current flowing in the resistance R5, and the phototransistor current of the photocoupler PC1. The phototransistor current in the photocoupler PC1 depends on a cathode current in a shunt regulator integrated circuit (IC) 1. Since the cathode current in the shunt regulator IC1 is controlled so that voltage of a control terminal to be a desired value, output voltage is fixed by changing the on-time period of the FET Q1. A voltage control of the secondary-side output DC voltage is executed by controlling the on-time period of the FET Q1.

Therefore, when power consumption is low, for example, when a device is in a standby state, the on-time period of the FED Q1 becomes short. Shortening of the on-time period may increase the number of switching of the FET Q1 per unit time, and increase switching loss. As a result, efficiency of the switching power supply device decreases.

About this problem of decrease of efficiency, for example, Japanese Patent No. 3386016 discusses a method for improving the efficiency in a configuration which can allow decrease of output voltage of a switching power supply device when the device becomes a standby state.

Figure 7:
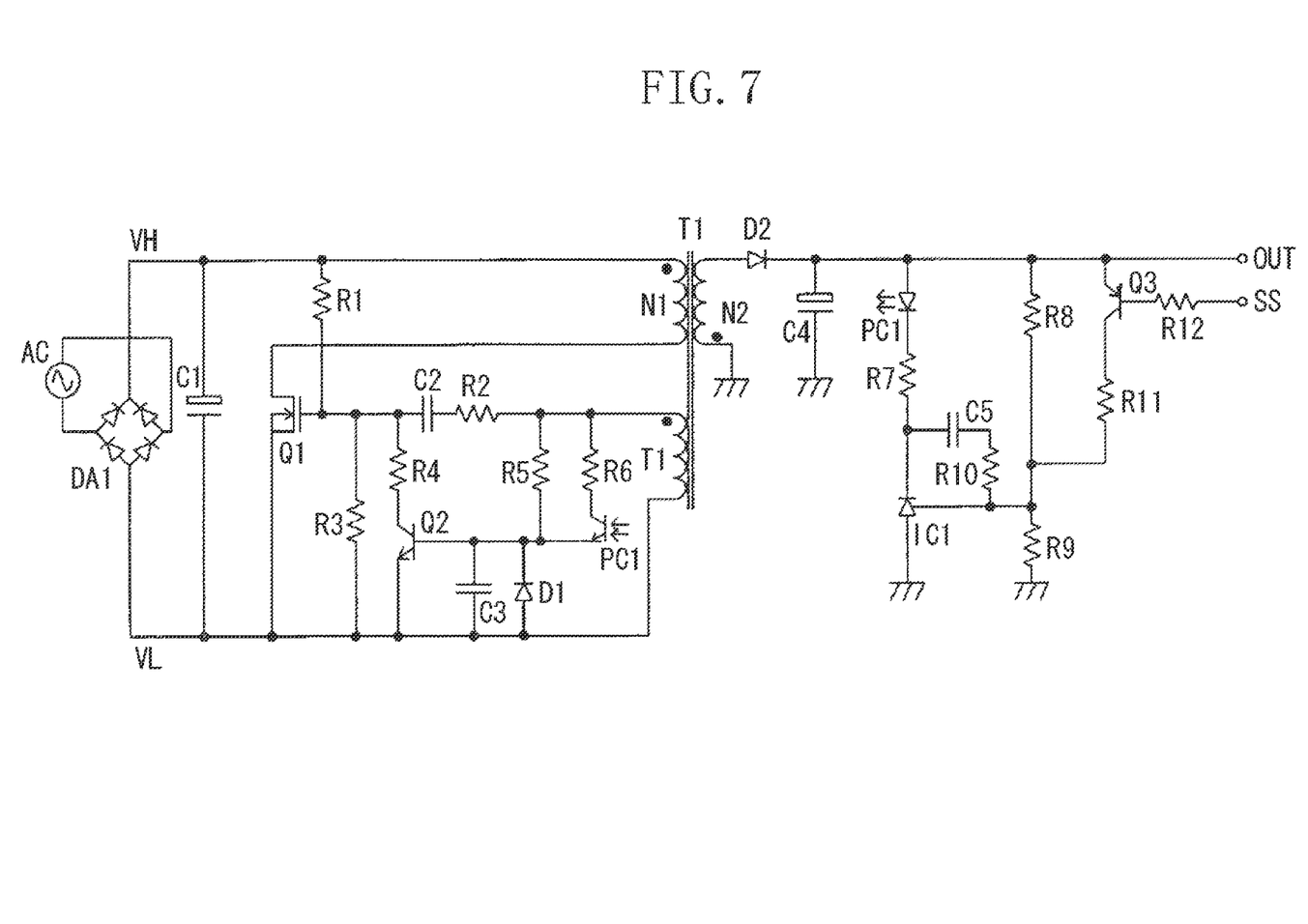
FIG. 7 illustrates a circuit of another conventional switching power supply device different from FIG. 5.

FIG. 7 illustrates a configuration for implementing the method discussed in Japanese Patent No. 3386016. Unlike the RCC in FIG. 5, an RCC in FIG. 7 includes an output voltage drop circuit including a transistor Q3 and resistances R11 and R12. The output voltage drop circuit is controlled by an input signal to a terminal SS.

In Japanese Patent No. 3386016, a winding ratio of the feedback winding NB to the secondary winding N2 of the transformer T1 is set as follows. When the energy stored in the transformer T1 is released from the secondary winding N2, ringing is generated in the secondary winding N2. The amplitude of the ringing is set according to whether the output voltage drop circuit functions or not. More particularly, when the output voltage drop circuit does not function, the gate voltage of the FET Q1 is set so as to exceed threshold voltage. When the output voltage drop circuit functions, the gate voltage of the FET Q1 is set so as not to exceed threshold voltage. Therefore, a gate voltage waveform of the FET Q1 becomes the waveform illustrated in FIG. 8 when the output voltage drop circuit functions. In addition, Vth in FIG. 8 is threshold voltage of the gate voltage of the FET Q1.

Figure 8:
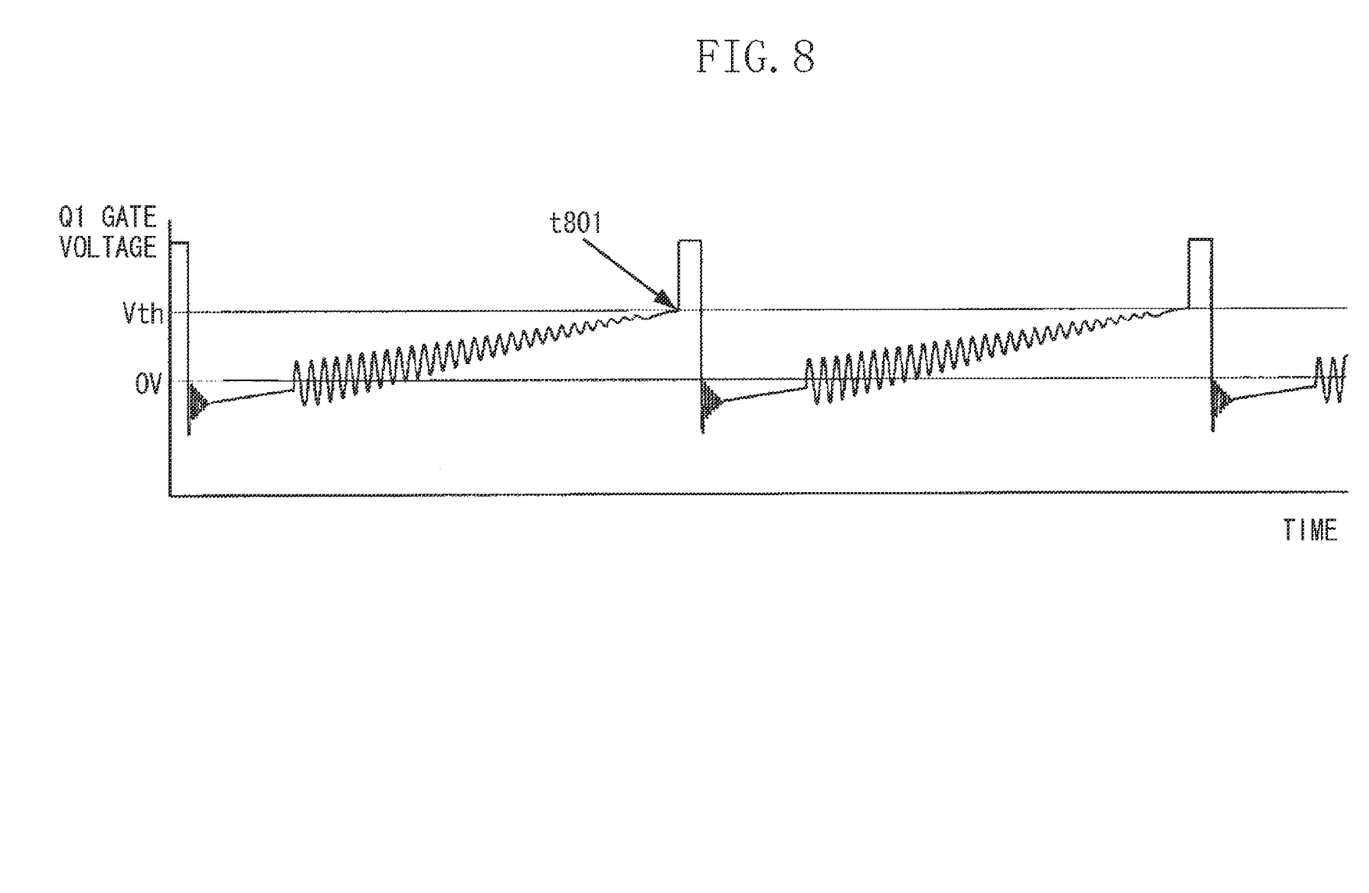
FIG. 8 illustrates gate voltage of a FET Q1 of the conventional switching power supply device in FIG. 7.

As illustrated with an arrow t801 in FIG. 8, the FET Q1 is turned on when the current flowing in from a starting resistance R1 is charged in the capacitor C2 and the gate voltage of the FET Q1 exceeds the threshold voltage Vth. Therefore, the number of switching of the FET Q1 decreases and decrease in the efficiency can be prevented.

A loss of the FET Q1 which is a main switching element includes a loss due to consumption of charge, which is stored in a capacity component between a drain and a source when the FET Q1 is off, by the FET Q1 at time of turning on and a switching loss at the time of turning off.

The loss at the time of the turning on can be acquired by multiplying a loss per one turning-on operation by oscillation frequency. If presuming that energy stored in the transformer T1 is entirely supplied to a load by flowing to the primary winding N1, the loss at the time of the turning off is described as follows.

The loss per one turning off operation is in proportion to a drain peak current Id of the FET Q1.

The turning off loss is acquired by multiplying a loss per one turning off operation by frequency.

The energy stored in the transformer T1 per one cycle of switching is in proportion to a square of the drain peak current Id of the FET Q1.

Power supplied to a load is acquired by multiplying the energy stored in the transformer T1 per one cycle of switching by frequency.

In the method discussed in Japanese Patent No. 3386016, a control of an output voltage value is performed by controlling the on-time period of the FET Q1. This control is performed by transmitting the cathode current in the shunt regulator IC1 to a primary side by the photocoupler PC1 and controlling a current flowing into the capacitor C3.

When a load becomes lower at the time of output voltage drop, the on-time period of the FET Q1 becomes shorter, but an off-time period of the FET Q1 is constant. Thus, even if the load changes, the number of switching of the FET Q1 per unit time is approximately constant. (Strictly, a frequency becomes quicker but does not affect the number of switching because the on-time period is shorter than the off-time period.)

Therefore, even when the load is lowered, the loss at the time of turning on does not change, and the drain peak current decreases in proportion to only a square root of the load. Thus, the loss increases because the turn-off time period is constant, and the efficiency decreases.

SUMMARY OF THE INVENTION

The present invention is directed to a switching power supply device capable of decreasing a loss of a main switching element when a load is lowered and reducing power consumption.

According to an aspect of the present invention, a switching power supply device includes a transformer, a switching unit which is connected with a primary winding of the transformer and configured to switch a current flowing to the primary winding, a start unit configured to start the switching unit, a voltage drop unit configured to lower output voltage from a secondary winding of the transform, and a current control unit configured to control an amount of a current flowing in the start unit when the switching unit is in an off state by lowering output voltage by the voltage drop unit.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIGS. 2A to 2E illustrate an operation waveform of the switching power supply device according to the first exemplary embodiment.

FIGS. 3A to 3E illustrate an operation waveform of the switching power supply device according to the first exemplary embodiment.

DESCRIPTION OF THE EMBODIMENTS

Various exemplary embodiments, features, and aspects of the invention will be described in detail below with reference to the drawings.

Configurations and operations of the present invention will be described below. After descriptions of the premise configurations and operations, particular exemplary embodiments will be described. In addition, the exemplary embodiments described below are just examples, and a technical scope of the present invention will not be restricted by the exemplary embodiments.

A power supply device according to a first exemplary embodiment will be described in detail below.

Figure 1:
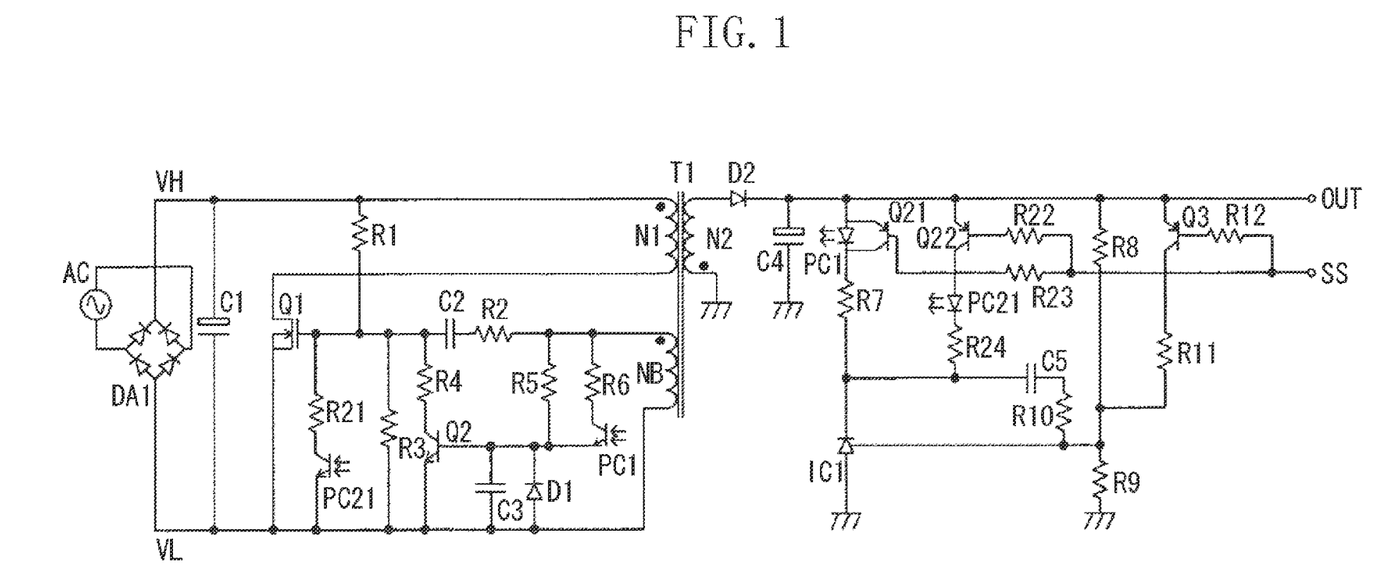
FIG. 1 illustrates a circuit of a switching power supply device according to a first exemplary embodiment of the present invention.

FIG. 1 illustrates a configuration of a switching power supply device according to the present exemplary embodiment. In FIG. 1, the switching power supply device includes a commercial power supply AC, a bridge diode DA1, and a smoothing capacitor C1. The smoothing capacitor C1 configures a DC power supply which rectifies and smoothes the commercial power supply AC, and converts the commercial power supply AC to DC voltage. A high voltage side of the DC voltage is denoted by VH, and a low voltage side of the DC voltage is denoted by VL. A transformer T1 includes a primary winding N1, a secondary winding N2, and a feedback winding NB. A MOSFET (hereinafter referred to as FET) Q1 which is a main switching element connects in series to the primary winding N1 of the transformer T. The FET Q1 is turned on when gate voltage of a gate, which is a control terminal of the FET Q1, reaches threshold voltage. A starting resistance R1 which is a resistance element and a capacitor C2 which is a capacitance element configure a start circuit, and turn on the FET Q1.

The switching power supply device further includes a diode D2 and a capacitor C4. A capacitor C3 is charged by a current flowing in the resistance R5 and a phototransistor current in the photocoupler PC1. The switching power supply device includes a shunt regulator IC1, and the phototransistor current in the photocoupler PC1 depends on a cathode current of the shunt regulator IC1. A transistor Q3, a resistance R11, and a resistance R12 correspond to a voltage drop circuit, are controlled by an input signal to a control terminal for dropping output voltage (hereinafter simply referred to as a terminal) SS, and lower the output voltage (voltage of an output terminal OUT) acquired from the secondary winding N2 of the transformer T. The switching power supply device of the present exemplary embodiment further includes resistances R2, R3, R4, R7, and R10, a capacitor C5, and a diode D1.

Different points of the switching power supply device of the present exemplary embodiment from the configuration illustrated in FIG. 7 are as follows. In the present exemplary embodiment, a phototransistor of a photocoupler PC21 and a resistance R21 are additionally arranged in parallel between the gate of the FET Q1 and a source on a primary side. Further, a transistor Q21 is added to a SS terminal on a secondary side via a resistance 23. The transistor Q21 short-circuits between a cathode and an anode of a light emitting diode (LED) of the photocoupler PC1 when the SS terminal is in an output voltage drop state. Further, a transistor Q22 is added to the SS terminal via a resistance R22. An emitter of the transistor Q22 is connected to the output voltage (the output terminal OUT). A collector of the transistor Q22 is connected to a cathode of the shunt regulator IC1 via the LED of the photocoupler PC21 and a resistance R24, which are added.

FIG. 2 illustrates an operation waveform of the switching power supply device in FIG. 1, and will be described in detail below.

When a device is in an operating state and a load is high, the SS terminal is set to be potential which is equal to the output voltage of the output terminal OUT. Therefore, the transistors Q3, Q21, and Q22 are in an off state. Since the transistor Q21 is in the off state, the photocoupler PC1 operates. Since the transistor Q22 is in the off state, the photocoupler PC21 does not operate. The shunt regulator IC1 controls the cathode current so that an internal reference voltage Vref and control terminal voltage have the same potential. Since the transistor Q3 is in the off state, the control terminal voltage of the shunt regulator IC1 becomes voltage which is obtained by dividing the output voltage by the resistances R8 and R9. Therefore, the shunt regulator IC1 controls the cathode current so that the output voltage becomes a value calculated by a formula of Vref/R9*(R8+R9). This operation is completely same to the operation in FIG. 5, so that detailed description will be omitted.

When a device is in a standby state and a load is small, the SS terminal is set to a ground (GND). Therefore, the transistors Q3, Q21, and Q22 are in an on state. Since the transistor Q21 is in the on state and the LED of the photocoupler PC1 is short-circuited between the cathode and the anode, the photocoupler PC1 stops an operation. On the other hand, the photocoupler PC21 becomes an operating state since the transistor Q22 is in the on state. Further, since the transistor Q3 is in the on state, the control terminal voltage of the shunt regulator IC1 becomes approximately equal to voltage obtained by dividing the output voltage by the parallel resistances R8 and R11 and the resistance R9. Therefore, the shunt regulator IC1 controls the cathode current so that the output voltage becomes a value calculated by a formula of Vref/R9*{(R8*R11)/(R8+R11)+R9}.

Accordingly, the output voltage when the transistor Q3 is in the on state (the device is in the standby state) decreases more than the output voltage when the transistor Q3 is in the off state (the device is in the operating state). This voltage is the same as the voltage in the circuit in FIG. 7 and a setting of the transformer T1 is the same. Therefore, the transistor Q3 and the resistances R11 and R12 which form the voltage drop circuit function under the standby state. At this time, in the ringing generated in the secondary winding N2, the gate voltage of the FET Q1 does not exceed the threshold voltage Vth. This is because that the flyback voltage generated in the feedback winding Nb depends on the output voltage, an absolute value of the flyback voltage decreases in proportion to dropping of the output voltage, and turning on of the FET Q1 is prevented.

The cathode current of the shunt regulator IC1 becomes the collector current in the transistor Q21 and the LED current in the photocoupler PC21. A change of the cathode current is reflected in the phototransistor current of the photocoupler PC21 on the primary side via the photocoupler PC21. Therefore, charging current to the capacitor C2 is a current obtained by subtracting the phototransistor current in the photocoupler PC21 from the current flowing from the starting resistance R1. In other words, a charging rate of the capacitor C2 is controlled by the phototransistor current in the photocoupler PC21, and time until when the gate voltage of the FET Q1 exceeds the threshold voltage is controlled. Since the photocoupler PC1 does not operate during the on-time period of the FET Q1, the on-time period of the FET Q1 is determined by the current flowing in the resistance R5. If the input voltage is the same, the on-time period the FET Q1 does not change and becomes the maximum on-time period of the FET Q1 of the switching power supply device of the present exemplary embodiment.

An operation of the switching power supply device according to the present exemplary embodiment will be described in detail below with reference to FIGS. 2A to 2E. A case where the cathode current in the shunt regulator IC1 is controlled by an on/off control is described.

Figure 2A:
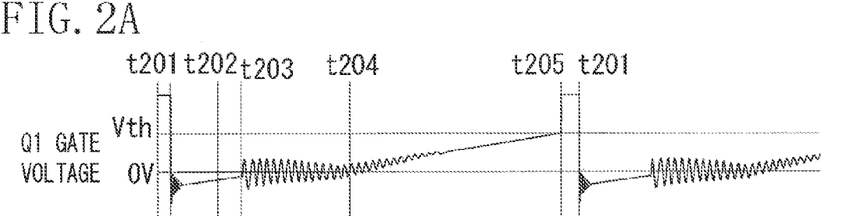
FIG. 2A illustrates gate voltage of an FET Q1.
Figure 2B:
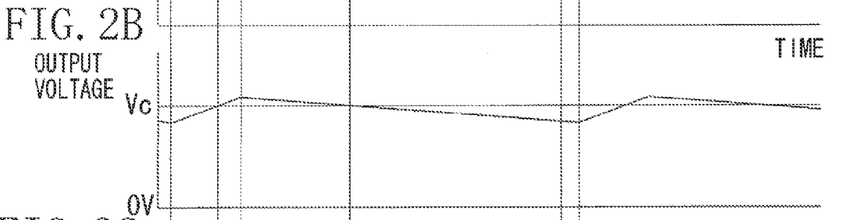
FIG. 2B illustrates output voltage.
Figure 2C:
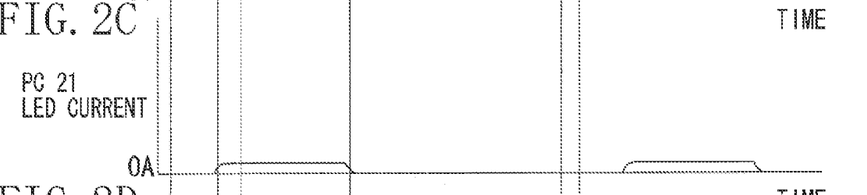
FIG. 2C illustrates a light-emitting diode (LED) current of a photocoupler PC21.
Figure 2D:
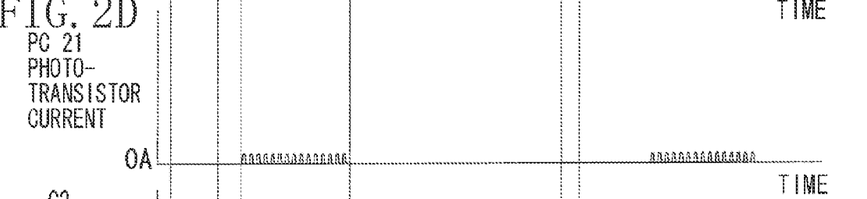
FIG. 2D illustrates a phototransistor current of the photocoupler PC21.
Figure 2E:
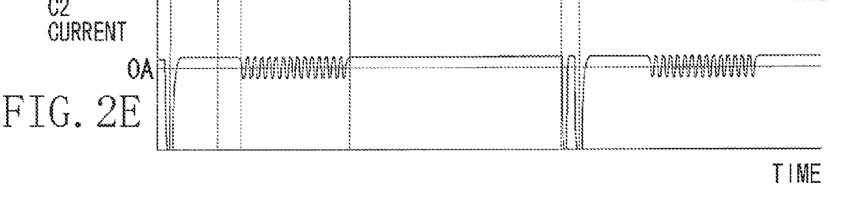
FIG. 2E illustrates a charging current in a capacitor C2.

FIG. 2A illustrates a waveform of the gate voltage of the FET Q1, and Vth is the threshold voltage of the gate voltage of the FET Q1. FIG. 2B illustrates a waveform of the output voltage. Vo is a control value of the output voltage set by the formula of Vref/R9*{(R8*R11)/(R8+R11)+R9}. FIG. 2C illustrates the LED current of the photocoupler PC21. FIG. 2D illustrates a waveform of the phototransistor current of the photocoupler PC21. FIG. 2E illustrates a waveform of the charging current of the capacitor C2.

The FET Q1 is in the on state during time from t205 to t201. As described above, the on-time period is set by the resistance R5, and is the maximum on-time period of the FET Q1 of the switching power supply device of the present exemplary embodiment. When the FET Q1 is turned off at the time t201 in FIG. 2, a current flows to the secondary winding N2 of the transformer T1. Then, the diode D2 and the smoothing capacitor C4 rectifies and smoothes the current, and the output voltage rises as illustrated in FIG. 2B. In FIG. 2B, the cathode current of the shunt regulator IC1 changes with a size of the output voltage comparing with the control value Vo of the output voltage. In other words, in the period in which the output voltage is higher than the control value Vo, the cathode current of the shunt regulator IC1 flows. In the period in which the output voltage is lower than the control value Vo, the cathode current of the shunt regulator IC1 does not flow. Therefore, the LED current of the photocoupler PC21 becomes the current as illustrated in FIG. 2C.

On the other hand, the gate voltage of the FET Q1 at the time of t201 rapidly decreases since the feed back winding NB of the transformer T1 becomes reverse bias due to turning off of the FET Q1. Then, the capacitor C2 is charged by the current from the starting resistance R1, and the gate voltage of the FET Q1 gradually increases. When the energy stored in the transformer T1 by the feedback winding NB is completely released, ringing is generated in the feedback winding NB at the time t203, but the gate voltage of the FET Q1 does not exceed the threshold voltage Vth.

The LED current of the photocoupler PC21 is reflected in the phototransistor current on the primary side. In other words, when the LED current of the photocoupler PC 21 is flowing (i.e., the time from t202 to t204), and when the gate voltage of the FET Q1 is 0V or higher (i.e., the time from t203 to t204), the start current from the starting resistance R1 flows in the phototransistor of the photocoupler PC21. Therefore, the start current does not become the charging current of the capacitor C2, and the gate voltage of the FET Q1 does not increase. As illustrated at the time t204 in FIG. 2, when the output voltage becomes lower than the control value Vo, the LED current of the photocoupler PC21 does not flow. Since the phototransistor current of the photocoupler PC21 also does not flow, the charging current flows to the capacitor C2, and the gate voltage of the FET Q1 increases. As illustrated at the time t205, when the gate voltage of the FET Q1 exceeds the threshold voltage Vth, the FET Q1 is turned on. In other words, the FET Q1 is turned on by the capacitor C2 in the start circuit.

When the ringing is generated in the feedback winding NB or the gate voltage of the FET Q1 is equal to or less than 0V, current cannot actually flow in the phototransistor of the photocoupler PC21. Therefore, a current waveform of the phototransistor of the photocoupler PC21 and a waveform of the charging current of the capacitor C2 becomes waveforms illustrated in FIGS. 2D and 2E. The current of the capacitor C2 greatly flows at the time t201 in FIG. 2E because the transistor Q2 becomes in the on state. Further, the current in the capacitor C2 greatly flows at the time t205 because a current flows in a gate capacity of the FET Q1 from the capacitor C2 due to turning on the FET Q1.

Accordingly, in the switching power supply device according to the present exemplary embodiment, when a load lowers, a slope of a reducing rate of the output voltage decreases, the time period from the time t203 to the time t204 is prolonged, and the off-time period of the FET Q1 is prolonged. Thus, the output voltage is stabilized. Since the on-time period of the FET Q1 becomes constant, the number of switching is decreased, and a loss of the FET Q1 which is a main switching element can be decreased.

Generally, when the shunt regulator is used for stabilizing an output of the switching power supply device, the cathode current is negatively fed back by an amount of a current. However, in the description of the present exemplary embodiment, the cathode current is subjected to the on/off control. According to a setting of the switching power supply device, the cathode current may be subjected to a general negative feedback control even when the SS terminal is under GND (the device is in the standby state). In this case, the charging current to the capacitor C2 is changed by changing a peak value of the current in FIG. 2D, and the off-time period of the FET Q1 is changed. Further, there can be an intermediate state of these states (a state that an amount of negative feedback changes within one switching cycle).

Figure 3A:
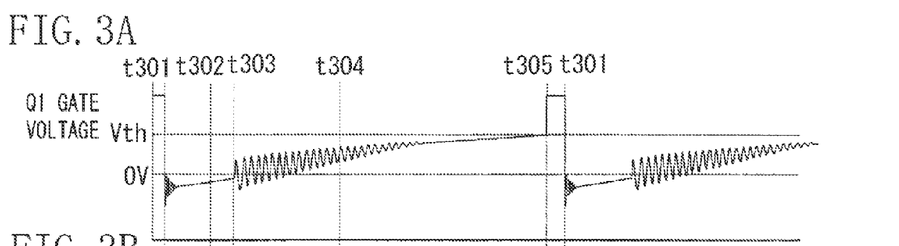
FIG. 3A illustrates gate voltage of the FET Q1.
Figure 3B:
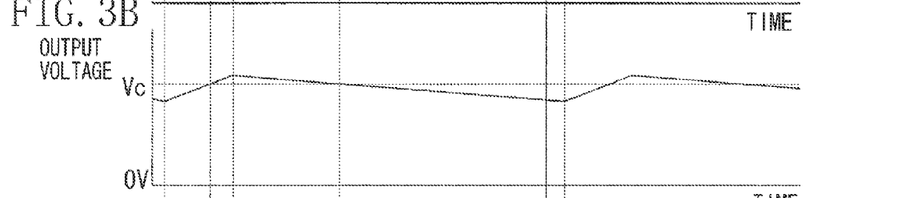
FIG. 3B illustrates the output voltage.
Figure 3C:
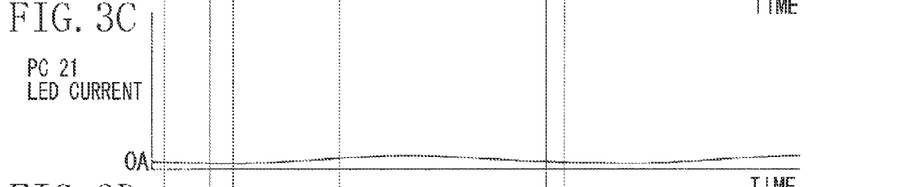
FIG. 3C illustrates the LED current of the photocoupler PC21.
Figure 3D:
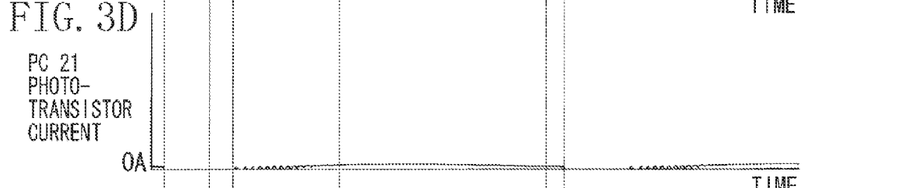
FIG. 3D illustrates the phototransistor current of the photocoupler PC21.
Figure 3E:
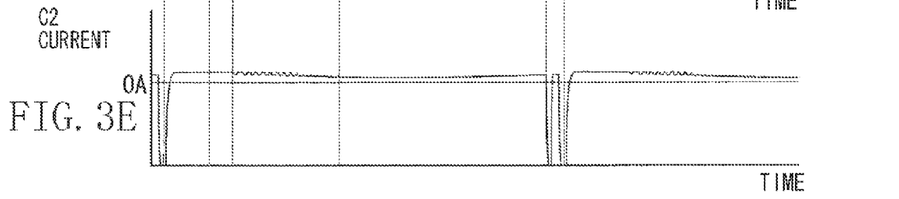
FIG. 3E illustrates the charging current in the capacitor C2.

An operation when the cathode current in the shunt regulator IC1 is subjected to the negative feedback control will be described below. FIGS. 3A to 3E illustrate operational waveforms in the above described intermediate state. FIG. 3A illustrates a waveform of the gate voltage of the FET Q1, and Vth is threshold voltage of the gate voltage of the FET Q1. FIG. 3B illustrates a waveform of the output voltage. Vo is a control value of the output voltage set by the formula of Vref/R9*{(R8*R11)/(R8+R11)+R9}. FIG. 3C illustrates the LED current of the photocoupler PC21. FIG. 3D illustrates a waveform of the phototransistor current in the photocoupler PC21. FIG. 3E illustrates a waveform of the charging current in the capacitor C2.

As illustrated in FIG. 3C, the LED current in the photocoupler PC21 does not change by the on/off operation but changes within a switching cycle. Corresponding to the change in the switching cycle, the waveform of the phototransistor current in the photocoupler PC21 changes as illustrated in FIG. 3D. Similar to the case illustrated in FIG. 2, a current does not flow when the gate voltage of the FET Q1 is equal to or less than 0V. The waveform of the charging current in the capacitor C2 becomes a waveform acquired by subtracting the phototransistor current of the photocoupler PC21 from the current from the starting resistance R1, so that the waveform as illustrated in FIG. 3E is obtained. Therefore, the cathode current of the shunt regulator IC1 can control the time until the capacitor C2 is charged and exceeds the gate voltage of the FET Q1. Accordingly, the output voltage can be stabilized by controlling the off-time period of the FET Q1, similar to the case illustrated in FIG. 2.

Accordingly, the output voltage value is controlled by controlling the off-time period of the FET Q1. Even when a load lowers, a drain peak current Id in the FET Q1 is approximately constant, and oscillation frequency lowers in approximate proportion to the load. Therefore, a loss at the time of turn-on and turn-off decreases in proportion to lowering of the load. As a result, when the load of the device in the standby state can be reduced and the output voltage of the switching power supply device can be decreased, efficiency can be improved more than the conventionally discussed method, and power consumption can be reduced.

According to the first exemplary embodiment, the loss of the main switching element of the switching power supply device when the load thereon is lowered and power consumption can be reduced.

A power supply device according to a second exemplary embodiment will be described in detail below.

Figure 4:
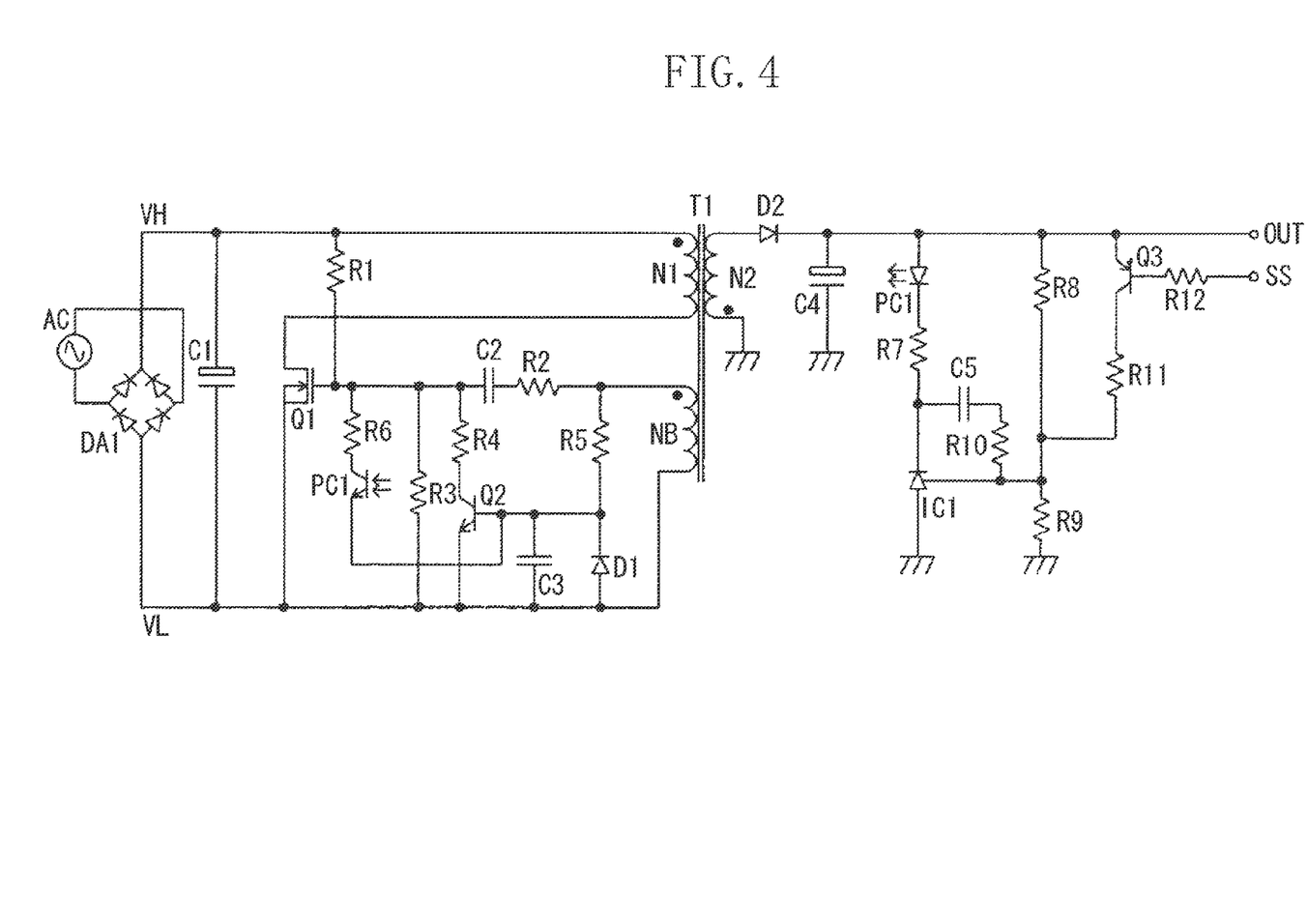
FIG. 4 illustrates a circuit of a switching power supply device according to a second exemplary embodiment.

FIG. 4 illustrates a circuit of a switching power supply device according to the second exemplary embodiment.

A connection between the phototransistor of the photocoupler PC1 on the primary side and the resistance R6 in FIG. 4 is different from that in FIG. 7. In other words, the photocoupler PC1 in the present exemplary embodiment functions as the photocoupler PC21 described in the first exemplary embodiment. Other configurations are similar to those in the first exemplary embodiment. Thus, detailed descriptions for the similar configurations are omitted, and the same numeral symbols are used in the description. With such configuration, the switching power supply device can control the off-time period of the FET Q1 using the phototransistor current in the photocoupler PC1.

The operation of the circuit in FIG. 4 is different according to whether the cathode current in the shunt regulator IC1 is subjected to the on/off control or the negative feedback control when the SS terminal is in GND (the device is in the standby state).

A case that the cathode current in the shunt regulator IC1 is subjected to the on/off control will be described below. When the cathode current in the shunt regulator IC1 is subjected to the on/off control, the operation waveform is similar to the waveform in FIG. 2 which is described in the first exemplary embodiment. During the time period from the time t202 to the time 204, the photocoupler PC1 in FIG. 4 performs an operation approximately similar to the photocoupler PC21 in FIG. 1. In FIG. 1, the phototransistor current in the photocoupler PC21 directly flows out from an emitter to the low voltage side VL of the DC voltage. At this time, the phototransistor current in the photocoupler PC1 in FIG. 4 flows out to the low voltage side VL of the DC voltage via a base emitter of the transistor Q2, or via the resistance R5 and the feedback winding NB. Operations in other periods are completely similar to those in the first exemplary embodiment.

The present exemplary embodiment can perform almost the same operation as that in the first exemplary embodiment. In addition to this, the present exemplary embodiment can reduce the number of components than the first exemplary embodiment.

On the other hand, when the cathode current in the shunt regulator IC1 is subjected to the negative feedback control, an operation waveform is similar to the operation waveform in FIG. 3. However, it is different from the waveform in FIG. 3 in that the on-time period of the FET Q1 does not reach the maximum on-time period set by the resistance R5. Since the phototransistor current in the photocoupler PC1 also flows during the time period from the time t305 to the time t301, the charging current to the capacitor C3 becomes the sum of the current flowing in the resistance R5 and the phototransistor current in the photocoupler PC1. However, similar to the operation illustrated in FIG. 3, since the off-time period of the FET Q1 is controlled, the output voltage is stabilized by changing both the on-time period and the off-time period of the FET Q1 in the operation in the present exemplary embodiment.

Therefore, the operation in the present exemplary embodiment can reduce the number of components than the first exemplary embodiment, but the number of switching is increased. However, since the off-time period is prolonged, the number of switching is less than that in the conventional method, so that the efficiency can be improved.

According to the present exemplary embodiment, the loss of the main switching element of the switching power supply device when the load thereon is lowered and the power consumption can be reduced while reducing the number of components.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2009-061111 filed Mar. 13, 2009, which is hereby incorporated by reference herein in its entirety.

What is claimed is:

1. A switching power supply device comprising:
   a transformer;
   a switching unit which is connected with a primary winding of the transformer and configured to switch a current flowing to the primary winding;
   a start unit configured to start the switching unit, the switching unit including a starting resistance and a capacitor;
   a voltage drop unit configured to lower output voltage from a secondary winding of the transformer; and
   a current control unit configured to control an amount of a current flowing in the capacitor when the switching unit is in an off state by lowering output voltage by the voltage drop unit,
   wherein the current control unit is connected between the start unit and the switching unit.

2. The switching power supply device according to claim 1, wherein the current control unit includes a switching element which is provided on a secondary side of the transformer and is turned on corresponding to the output voltage lowered by the voltage drop unit, and a photocoupler which is provided on a primary side of the transformer.

3. The switching power supply device according to claim 1, wherein the photocoupler is connected in parallel to the switching unit.

4. The switching power supply device according to claim 1, wherein
   the switching unit is a field-effect transistor (FET), and
   the FET is turned on when voltage of a control terminal reaches a threshold value by voltage generated in the start unit or a feedback winding of the transformer.

5. The switching power supply device according to claim 2, further comprising:
   a control element which is configured to control an operation of the photocoupler and provided on the secondary side of the transformer,
   wherein the operation of the photocoupler is controlled by controlling a current flowing in the control element according to the output voltage lowered by the voltage drop unit.

6. The switching power supply device according to claim 5, wherein the control element is a shunt regulator integrated circuit (IC).

* * * * *